United States Patent [19]

Mogi

[11] Patent Number: 5,160,166
[45] Date of Patent: Nov. 3, 1992

[54] LIMIT SWITCH UNIT AND PASSIVE SEAT BELT ASSEMBLY EQUIPPED WITH THE SAME

[75] Inventor: Shinobu Mogi, Fujisawa, Japan

[73] Assignee: Nippon Seiko Kabushiki Kaisha, Tokyo, Japan

[21] Appl. No.: 749,498

[22] Filed: Aug. 16, 1991

Related U.S. Application Data

[63] Continuation of Ser. No. 492,070, Mar. 12, 1990, abandoned.

[30] Foreign Application Priority Data

Mar. 14, 1989 [JP] Japan ............................. 1-28119[U]

[51] Int. Cl.$^5$ ................................................ B60R 22/06
[52] U.S. Cl. ....................................... 280/804; 200/47
[58] Field of Search ............... 280/802, 804, 801, 808; 297/468, 469, 481, 483; 206/47, 61.58 B, 540

[56] References Cited

U.S. PATENT DOCUMENTS

| | | | |
|---|---|---|---|
| 3,340,390 | 9/1967 | Imre | 200/540 |
| 3,670,118 | 6/1972 | Stowe | 200/47 |
| 4,618,164 | 10/1986 | Ryo | 280/804 |
| 4,708,367 | 11/1987 | Yoshitsugu | 280/804 |
| 4,900,060 | 2/1990 | Yamamoto | 280/804 |
| 4,991,873 | 2/1991 | Matsui | 280/804 |

FOREIGN PATENT DOCUMENTS 2468486  5/1981  France ..................... 200/61.58 B Primary Examiner—Karin L. Tyson
Attorney, Agent, or Firm—Wegner, Cantor, Mueller & Player

[57] ABSTRACT

A limit switch unit suitable for use in a passive seat belt system of the type that a movable anchor with a webbing connected thereto is moved by a drive member such as a drive wire along a rail between an occupant-restraining position and an occupant-releasing position. The limit switch unit is composed of a guide for introducing the drive member into the rail and a limit switch for detecting the arrival of the movable anchor at the occupant-restraining position or the occupant-releasing position. The limit switch is integral with the guide, whereby the limit switch unit is formed. A passive seat belt system with the limit switch unit incorporated therein is also disclosed.

9 Claims, 9 Drawing Sheets

LIMIT SWITCH UNIT AND PASSIVE SEAT BELT ASSEMBLY EQUIPPED WITH THE SAME

This application is a continuation of U.S. application Ser. No. 07/492,070, filed Mar. 12, 1990, now abandoned.

BACKGROUND OF THE INVENTION

1) Field of the Invention

The present invention relates to a passive seat belt system of the type that an occupant-restraining webbing is moved between an occupant-restraining position and an occupant-releasing position automatically, for example, responsive to the opening or closure of a door arranged adjacent a seat to which the passive seat belt system is applied. Especially, this invention is concerned with a passive seat belt system having characteristic features in the structure of a limit switch for detecting the arrival of a movable anchor, to which the above webbing is fastened, at the occupant-restraining position or occupant-releasing position along a guide member to stop any further movement of the movable anchor. The present invention also relates to such a limit switch unit.

2) Description of the Related Art

Reference is first had to FIGS. 10-12, which illustrate by way of example parts of a companion passive seat belt system designed sometime ago except for certain details which are depicted in FIG. 12 and which pertain to the present invention. Illustrated in these drawings include a limit switch and a tube joint. The tube joint connects a cover tube—which serves to protect and guide a drive member for transmitting a drive force from a drive source to a movable anchor, such as a wire—to the side of a guide member for the movable anchor.

In these drawings, an anchor base 51 is arranged on a rear end portion of a rail 50 extending as a guide member along a center pillar of a vehicle body, namely, in the vicinity of an occupant-restraining position. The anchor base 51 is fixed on the side of the vehicle body by an anchor bolt 52. A latch mechanism 53 is disposed inside the anchor base 51. An anchor drive block 55 is fixed at a leading end portion of a drive wire 54. As the drive wire 54 is paid out, the anchor drive block 55 is brought into engagement with the movable anchor 56 so that the movable anchor 56 is dragged toward the occupant-restraining position. The movable anchor 56 is then latched by the latch mechanism 53, whereby the movable anchor 56 is stopped at the occupant-restraining position. When the movable anchor 56 is driven from the occupant-restraining position to the occupant-releasing position located frontward of the occupant-restraining position, the wire 54 moves upwards as viewed in FIG. 11 and, by a latch actuator block 55' disposed on the wire 54 at a position a little apart from the anchor drive block 55, the wire 54 begins to have the movable anchor 56 moved toward the occupant-releasing position while disengaging the latch mechanism 53 from the movable anchor 56 by the action of the latch actuator block 55'. These members are however not directly related to the present invention and their detailed description is omitted herein. For further details, reference may be had, for example, to U.S. Pat. No. 4,695,076 issued Sep. 22, 1987 to Toshiyuki Hane.

An emergency release buckle 57 is attached to the movable anchor 56. A tongue 64 carrying a webbing 63 fastened or otherwise connected at one end thereof to the tongue 64 is detachably inserted in and latched with the buckle 57. In the event of an emergency, the webbing 63 can be released from an occupant-restraining state by unlatching the tongue 64 from the buckle 57, thereby permitting the egress of an occupant. Further, the anchor bolt 52 is in engagement with the movable anchor 56 which is in the occupant-restraining position, whereby the anchor bolt 52 also serves to bear pulling forces applied to the movable anchor 56 from the webbing 63.

As shown in FIG. 11, a rear end switch 58 which detects the arrival of the movable anchor 56 at the occupant-restraining position and prevents any further movement of the wire 54 is disposed in a lower left-hand part of the anchor base 51, and a tube joint 59 discrete from the rear end switch 58 is attached to the rail 50 by a pin 60. The tube joint 59 receives and embraces a wire cover tube 61 and guides the wire 54 from an unillustrated drive means (e.g., motor) to the tube joint 59, and guides the wire 54 from the wire cover tube 61 into the rail 50.

In the companion passive seat belt system described above, the limit switch and tube joint are provided as discrete members, thereby involving the drawbacks that more components are required and more assembly steps are hence required.

Further, as illustrated in FIG. 11, the discrete rear end switch and tube joint are arranged side by side and the drive member, such as a wire, guided into the rail vertically extends through the anchor base. There is accordingly a limitation to any attempt of reducing the widthwise dimension of the anchor base. Although there is a recent trend toward narrower center pillars for use in motor vehicles, the above limitation makes it impossible to arrange an anchor base in such a narrow center pillar.

SUMMARY OF THE INVENTION

An object of the present invention is therefore to solve the above problem and to provide a limit switch unit requiring fewer parts and permitting a dimensional reduction and also to provide a passive seat belt system making use of such a limit switch unit.

In one aspect of the present invention, there is thus provided a limit switch unit suitable for use in a passive seat belt system of the type that a movable anchor with a webbing connected thereto is moved by a drive member along a rail between an occupant-restraining position and an occupant-releasing position. The limit switch unit comprises:

a means for guiding the drive member into the rail; and a limit switch for detecting the arrival of the movable anchor at the occupant-restraining position or the occupant-releasing position, said limit switch being integral with the guide means.

The components which perform plural functions respectively are combined together into the integral limit switch unit as described above. Therefore, their overall dimensions and manufacturing cost can be reduced. The limit switch unit has made it unnecessary to assemble the individual components one by one. The assembly and positioning of such components have been rendered extremely easy. It is possible to accurately set the relative positions of the individual components. Their assembly can be completed in an extremely small number of steps. For example, a drive means (e.g., motor) including a drive member (e.g., drive wire) can be assembled to a rail by securing on an anchor base the limit switch unit with a wire cover tube embraced therein and then fixing the anchor base on the rail.

A cavity or opening of the limit switch unit, in which the bulged portion of the wire cover tube is embraced, may be enlarged in the direction of the length of the wire. This permits absorption of variations in the length of the wire cover tube and in the position of arrangement of the limit switch unit. A guide portion may be formed in the limit switch unit. This makes it possible to prevent the wire from hitting or otherwise contacting with a proximal end portion of the rail, whereby wire damages can be avoided. The limit switch unit may also be provided with one or more lugs or recesses which may be brought into engagement with matching recesses or lugs formed in or on one or more adjacent components. These lugs or recesses permit precise positioning of the limit switch unit and wire. It is also possible to transmit loads, which may be exerted onto the limit switch unit from the drive means, to the anchor base or the like by way of such lugs, whereby the limit switch unit can be protected from such loads.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
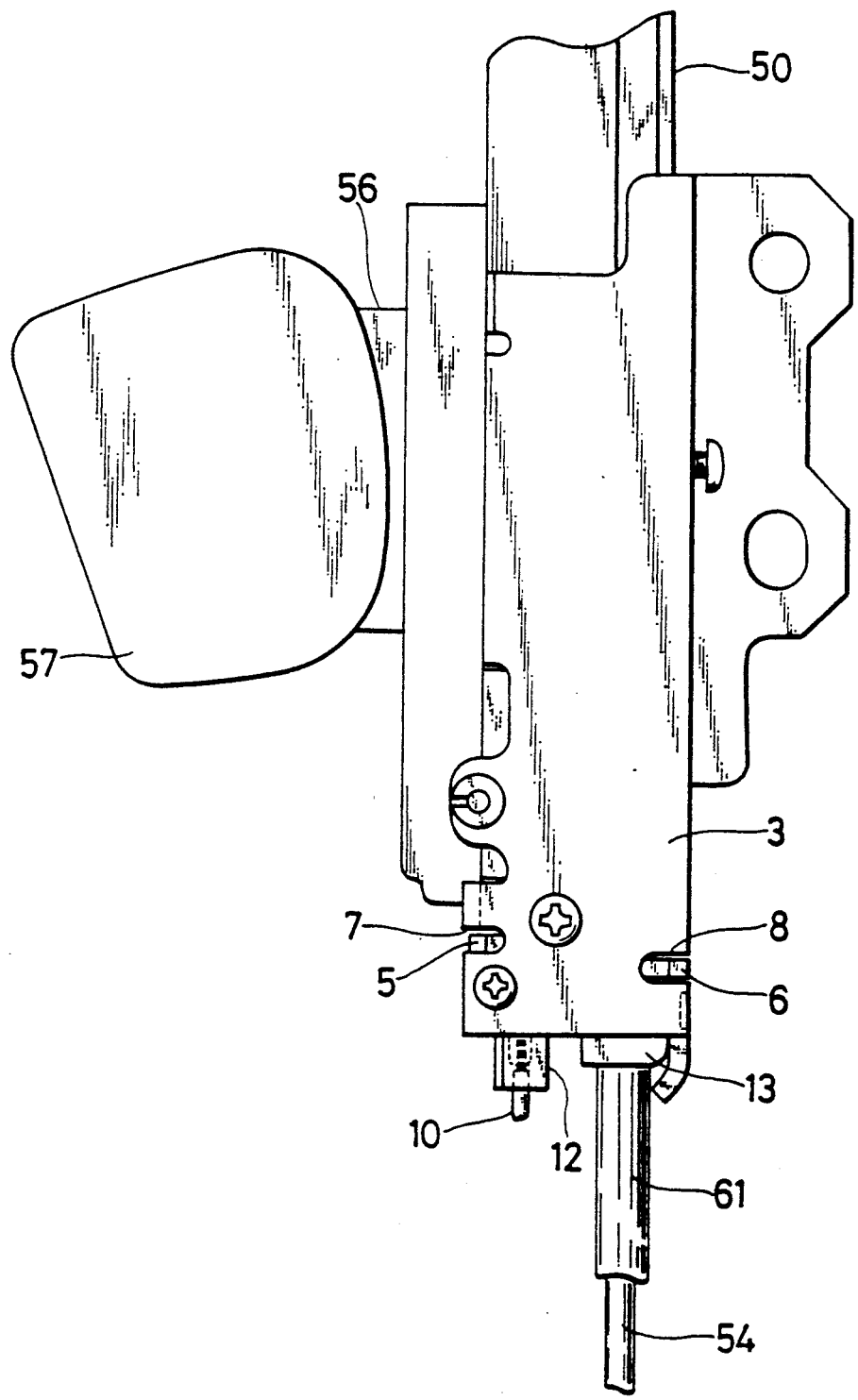
FIG. 1 is a fragmentary side view of one embodiment of the passive seat belt assembly according to the present invention.
Figure 2:
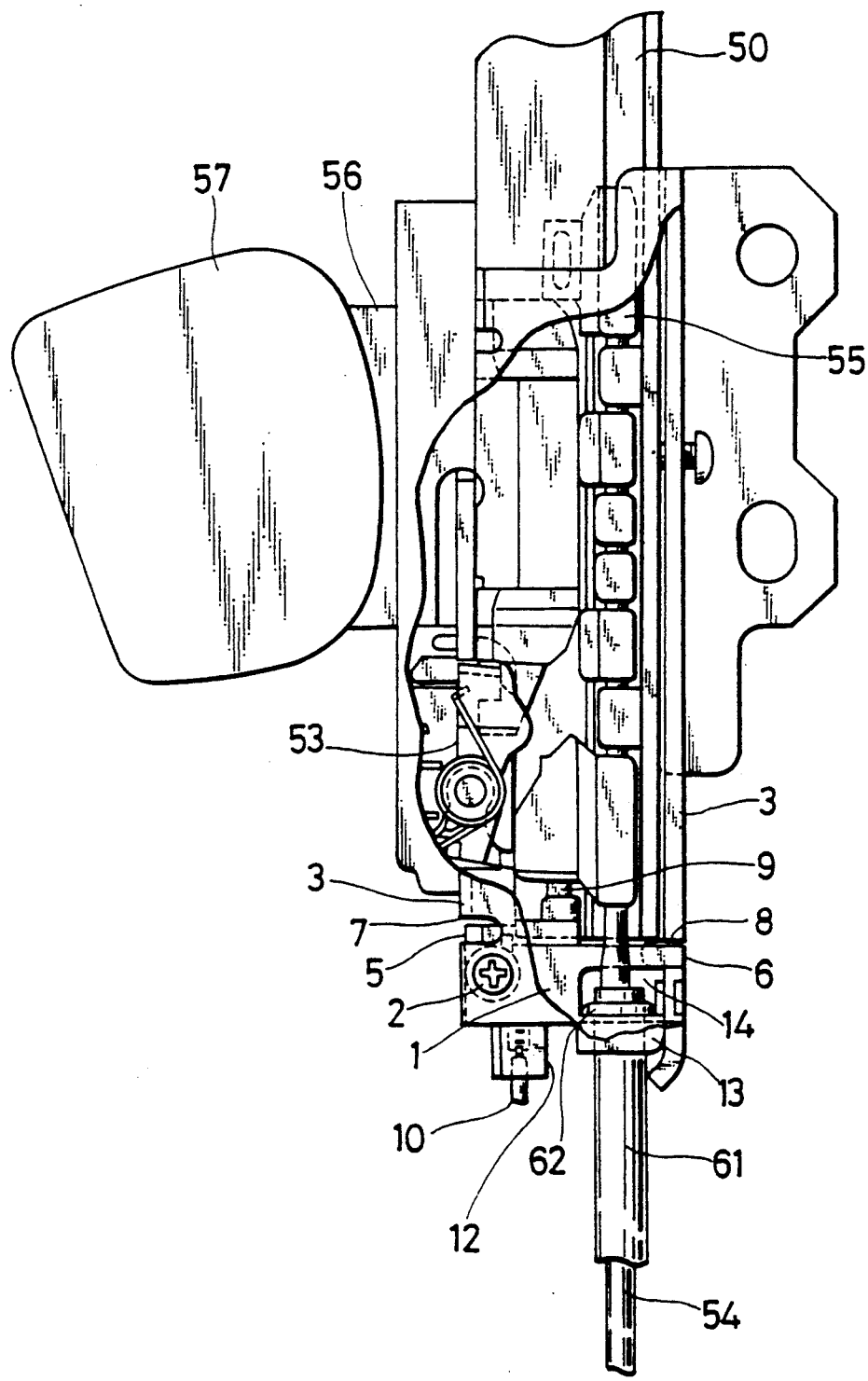
FIG. 2 is a partly cut-away fragmentary side view of the passive seat belt assembly of FIG. 1, illustrating the internal structure.
Figure 10:
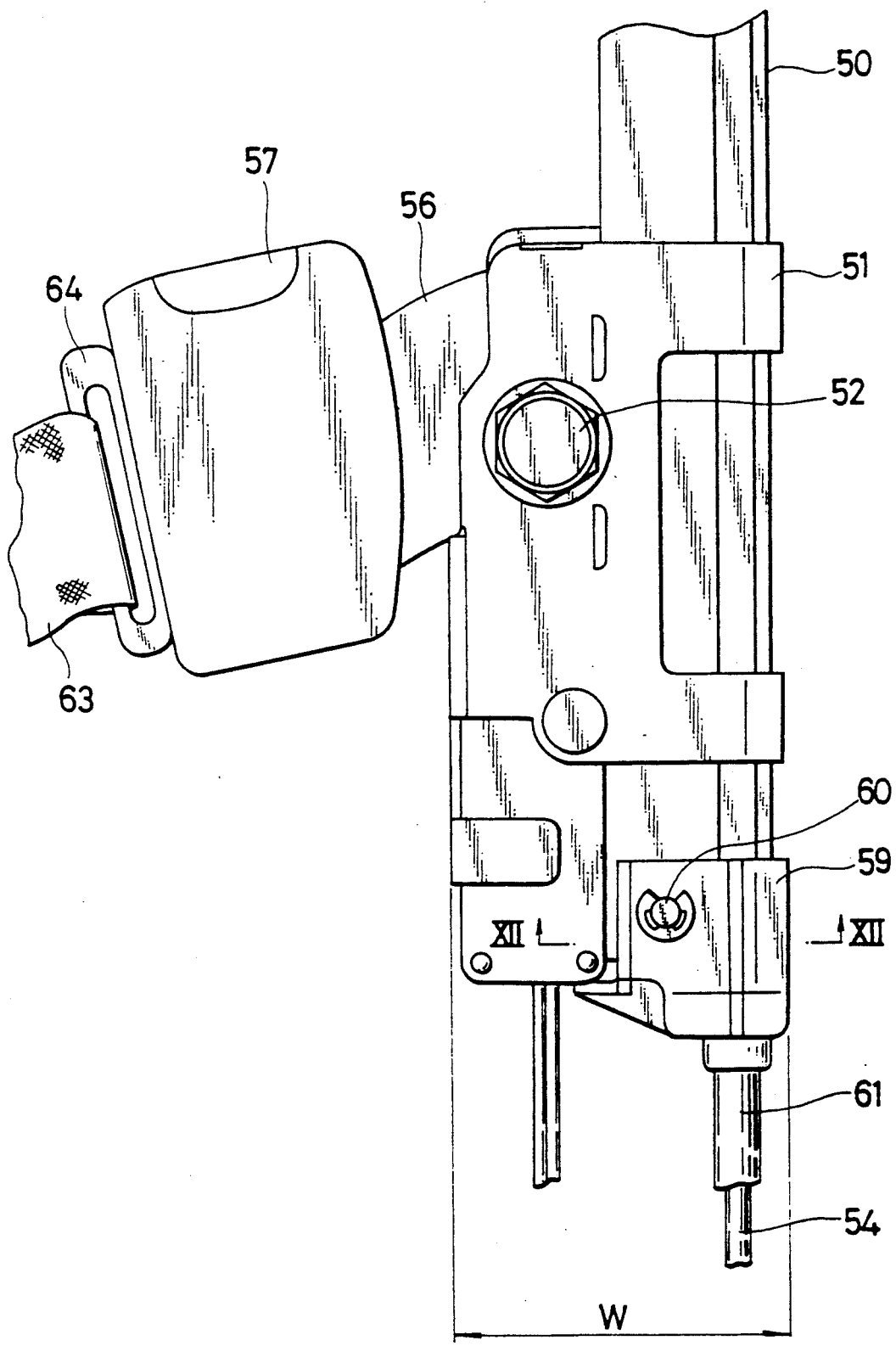
FIG. 10 is similar to FIG. 1 but showing a companion passive seat belt assembly.
Figure 11:
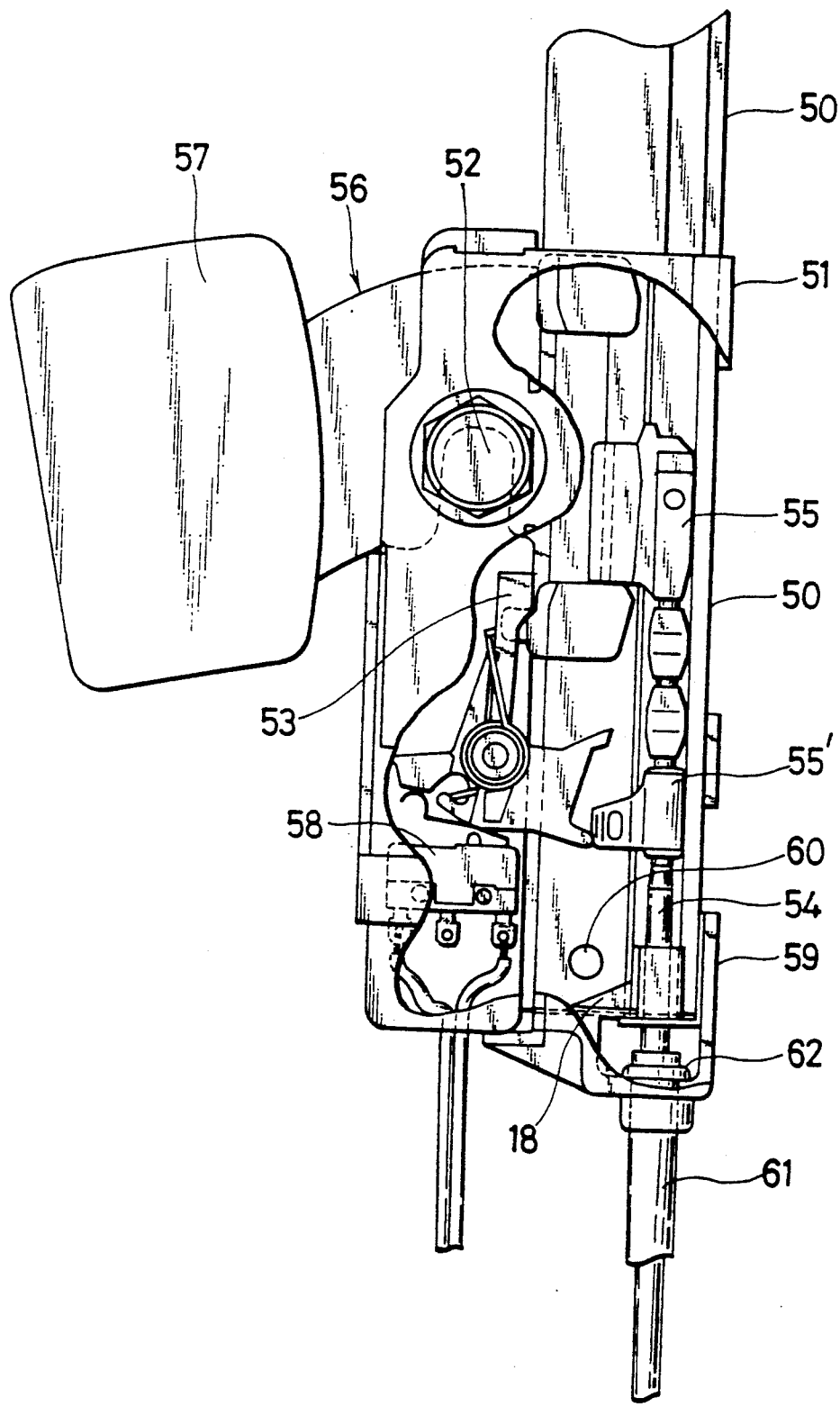
FIG. 11 is similar to FIG. 2 but showing the companion passive seat belt assembly of FIG. 10.

In FIGS. 1 and 2, members or parts indicated by similar numerals to FIGS. 10 and 11 perform substantially the same functions and their description is omitted herein.

Figure 3:
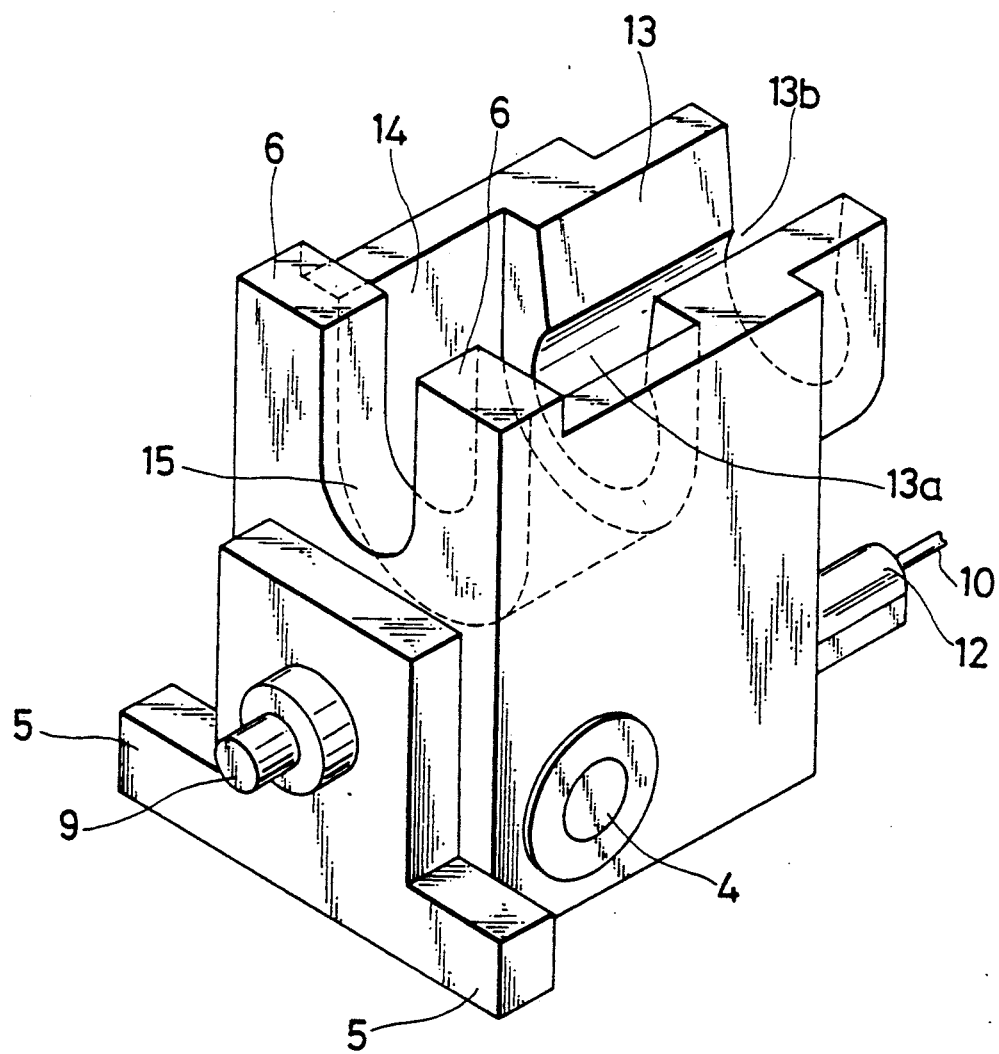
FIG. 3 is an enlarged perspective view of one embodiment of the limit switch unit according to the present invention and incorporated in the passive seat belt assembly of FIGS. 1 and 2.

A limit switch unit 1 is mounted within a casing on the anchor base 3 by a self-tapping screw 2. As is understood from FIG. 3 which illustrate the limit switch unit 1 in detail, the limit switch unit 1 has a pair of positioning lugs 5,6 at a location close to a hole 4 and at another location remote from the hole 4, respectively. These lugs 5,6 are fitted in notches 7,8 formed in a casing of the anchor base 3. By the lugs 5,6 and notches 7,8, the limit switch unit 1 is precisely positioned without rotation about the self-tapping screw 2. A load is applied to the limit switch unit 1 from the drive means (e.g., motor) by way of the wire cover tube 61 upon assembly of the passive seat belt system on a vehicle body. The lugs 5,6 and 7,8 also make it possible to transmit this load to the anchor base 3, so that the limit switch unit 1 is protected from the load.

The limit switch unit 1 also has an actuator 9. When the actuator 9 detects that the movable anchor 56 is at the occupant-restraining position, the limit switch unit 1 outputs a corresponding signal to the drive means by way of a harness 10 so that the movement of the wire 54 is controlled. An extension 12 is formed at a position where the harness 10 enters the limit switch unit 1. This extension 12 protects the harness 10 from excessive bending, whereby cut-down of electric wires inside the harness 10 can be prevented.

The limit switch unit 1 defines an embracive recess 13, in which the bulged portion 62 of the wire cover tube 61 is held. The embracive recess 13 includes a cylindrical space 13a, which has a diameter slightly greater than the diameter of the wire cover tube 61 but smaller than that of the bulged portion 62, and a guide space 13b opening outwardly with a progressively increasing width from the cylindrical opening 13a. The wire cover tube 61 can therefore be fitted downwardly, as viewed in FIG. 3, into the cylindrical space 13a via the guide space 13b, whereby the wire cover tube 61 can take the position illustrated in FIG. 2.

Figure 4:
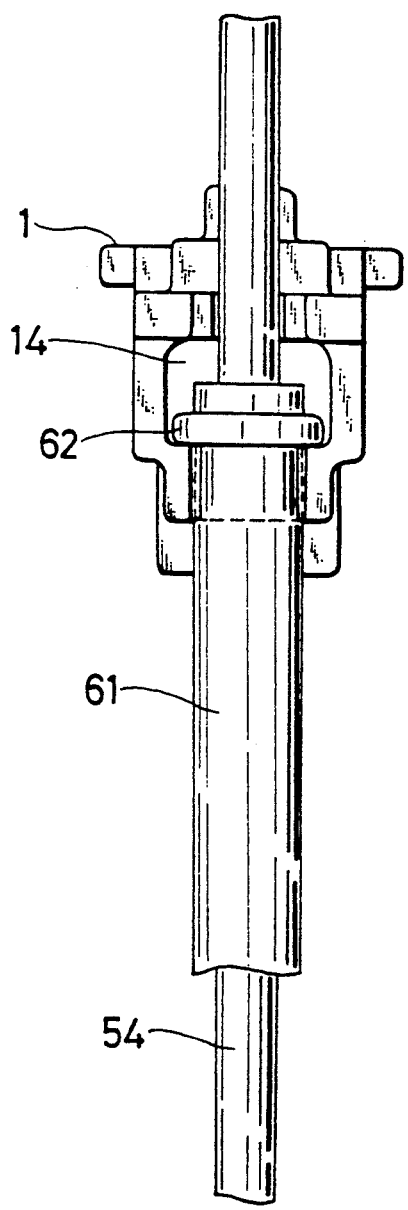
FIGS. 4 and 5 show a play of a bulged portion of a wire cover tube in a thrusting direction, namely, in the direction of the length of a wire.
Figure 5:
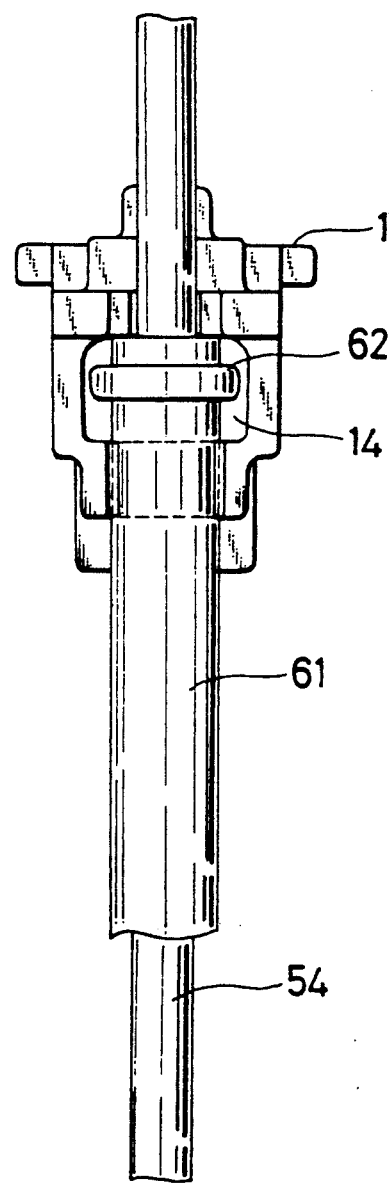

Adjacent the embracive recess 13, a cavity 14 is formed to allow the bulged portion 62 to play in the thrusting direction, namely, in the direction of the length of the wire 54. Owing to the formation of the cavity 14, the bulged portion 62 is allowed to move to the extent equal to the length of the cavity 14 as depicted in FIGS. 4 and 5. The cavity 14 can therefore absorb various designing variations, whereby the assembly of the associated components is facilitated.

Figure 6:
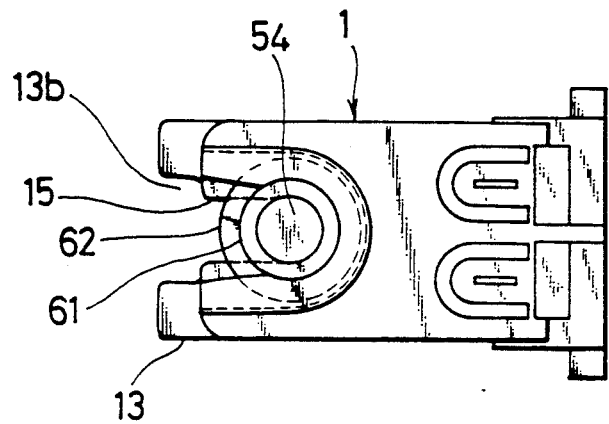
FIG. 6 illustrates a guide portion for the wire.

Further, a wire guide portion 15 is provided adjacent the cavity 14. This guide portion 15 has such a width that only the wire 54 extends therethrough. The wire 54 tends to be swung when a pushing force is applied to it from the drive means upon causing the movable anchor 56 to advance to the occupant-releasing position. The above width of the guide portion 15 can prevent the wire 54 from being swung excessively and hence can protect the wire 54 from being damaged by a proximal end portion of the rail 50, said end portion being in contact with the guide portion 15. Since the guide portion 15 is outwardly flared as shown in FIG. 6, the wire 54 can be smoothly guided into the guide portion 15 upon introduction of the wire cover tube 61 and bulged portion 62 into the cylindrical space 13a and the cavity 14 respectively.

Figure 7:
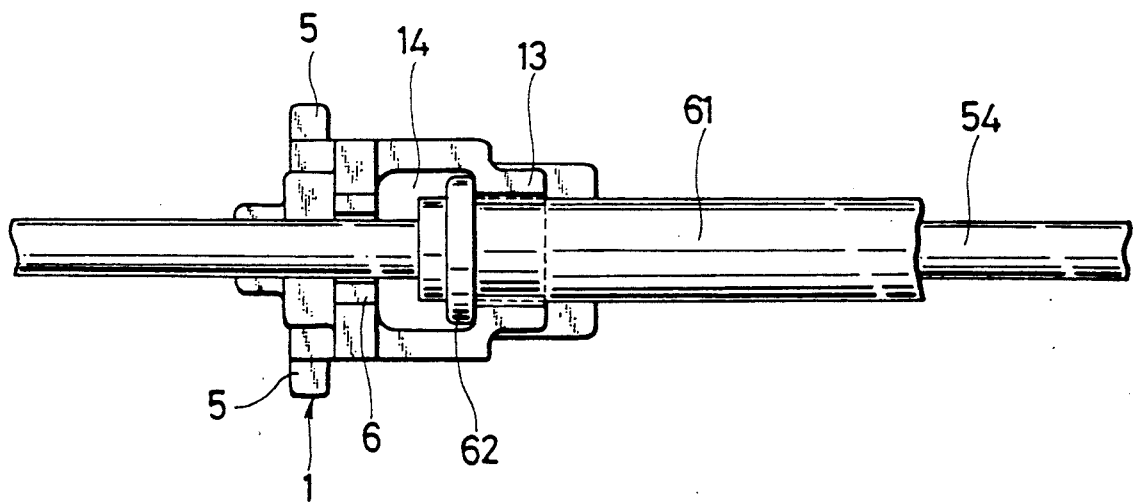
FIG. 7 is a view of the limit switch unit of FIG. 3 as viewed from the side of the wire.
Figure 8:
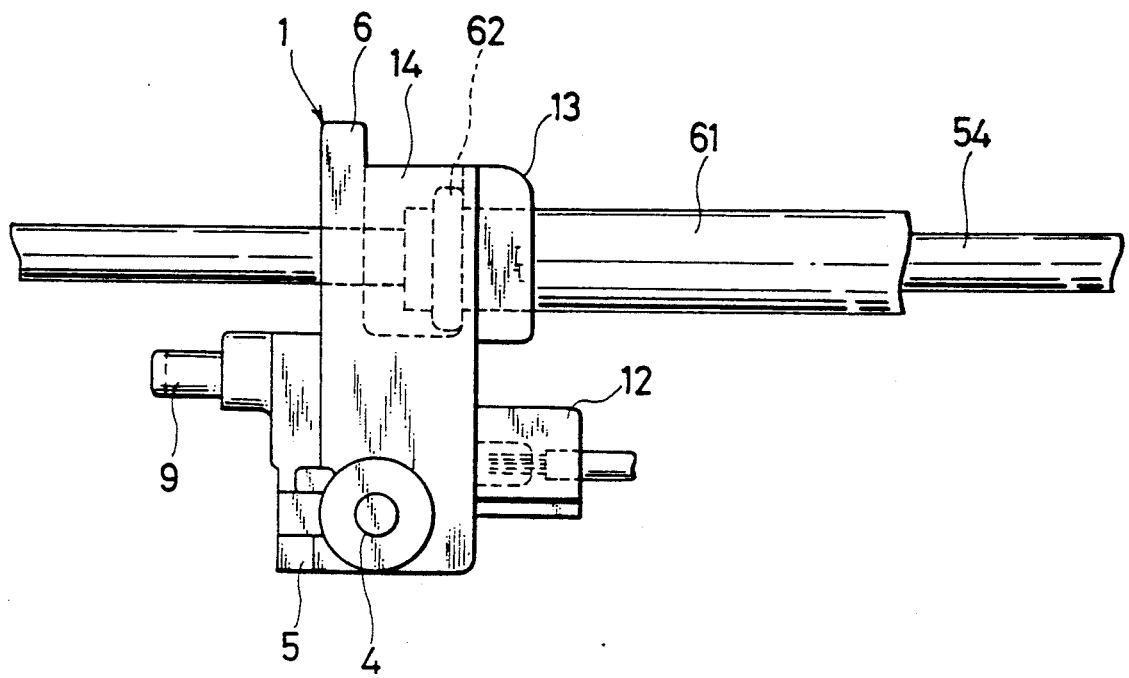
FIG. 8 is a view of the limit switch unit of FIG. 3 as viewed from the side opposite to the wire.

FIGS. 7 and 8 are illustrations of the limit switch unit 1 as viewed from the side of the cable 54 and from the opposite side, respectively.

As is understood from the foregoing description, the components for performing their respective functions are combined together into the limit switch unit 1 of the integral and compact structure. It is hence possible to reduce the width (see the width W in FIG. 10) of the movable anchor and also to make the positioning and assembly of such components extremely simpler.

Since the wire 54 is smoothly driven along the rail 50 in accordance with signals from a limit switch portion of the limit switch unit 1, the webbing 63 whose movement is controlled by the movable anchor 56 is smoothly moved between the occupant-restraining position and the occupant-releasing position.

Figure 9:
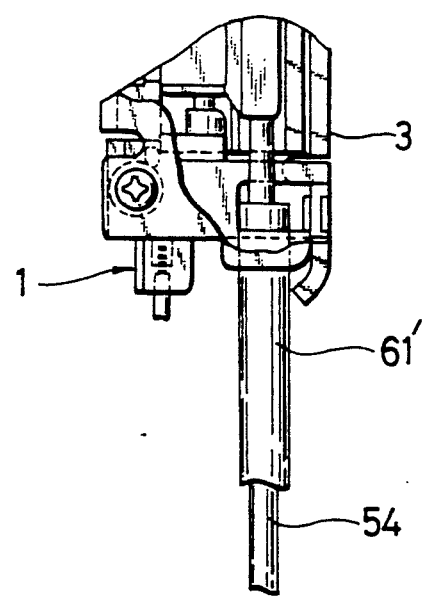
FIG. 9 is a view showing one modification of the limit switch unit of FIG. 3.

In the embodiment described above, the wire cover tube 61 has the bulged portion 62. The wire cover tube 61 can be replaced by a wire cover tube 61' shown as a modification in FIG. 9, the latter wire cover tube being free of any bulged portion. In this case, the wire cover tube 61' is simply inserted into the limit switch unit 1.

Figure 12:
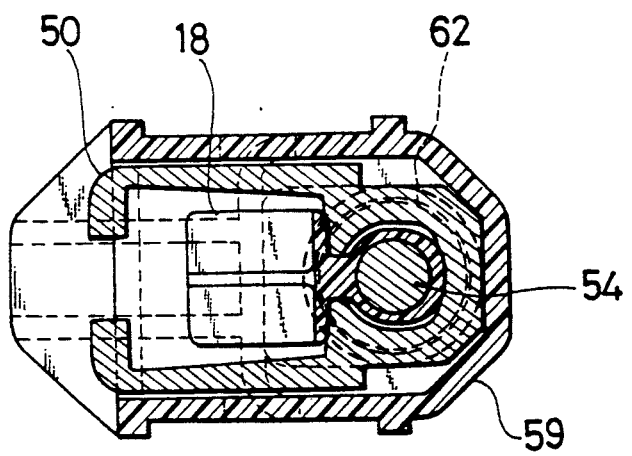
FIG. 12 is a transverse cross-section of the companion passive seat belt assembly of FIG. 10, taken in the direction of arrows XII—XII of FIG. 10, but certain details are not actually included in the companion passive seat belt assembly but pertain to the present invention.

As another modification, the wire guide portion 15 of the limit switch unit 1 can be omitted and instead, a rail cap 18 can be fitted on a proximal end portion of the rail 50 as depicted in FIG. 12. The rail 18 is also effective for preventing damages to the wire 54.

In the above embodiment the limit switch unit 1 is arranged at the occupant-restraining position. The limit switch unit may however be arranged as a front end limit switch unit in models where a drive member such as a wire is introduced from the front end of a rail (i.e., from the side of the occupant-releasing position).

I claim:

1. A passive seat belt system of the type that a movable anchor with a webbing connected thereto is moved by a drive member along a rail between an occupant-restraining position and an occupant-releasing position, said system comprising:
   a limit switch unit disposed within a casing near one end of the rail, said limit switch unit comprising:
   (i) limit switch means for detecting the arrival of the movable anchor at the occupant-restraining position or the occupant-releasing position;
   (ii) housing means for housing the limit switch means within the casing; and
   (iii) guide means defined by said unit for guiding the drive member into the rail, said guide means being formed integrally and of one piece with said housing means; and
   a cover tube for guiding the drive member between a drive means for the drive member and a proximal end of the rail, and said guide means having a portion for holding one end of the cover tube, said one end being remote from said driving means, at a position adjacent the proximal end of the rail when the unit is assembled in the passive seat belt system.

2. The system of claim 1, wherein a bulged portion having an outer diameter greater than the cover tube is formed integrally with the end of the cover tube and the bulged portion is in engagement with the holding portion of the guide means.

3. The system of claim 2, wherein the holding portion defines a cavity which allows the bulged portion to play in the direction of the length of the tube.

4. The system of claim 1, further comprising a rail cap to be attached to the proximal end of the rail so that the drive member is guided by the rail cap into the rail when the unit is assembled in the passive seat belt system.

5. A passive seat belt system of the type that a movable anchor with a webbing connected thereto is moved by a drive member along a rail between an occupant-restraining position and an occupant-releasing position, comprising:
   guide means for guiding the drive member into the rail;
   a limit switch for detecting the arrival of the movable anchor at the occupant-restraining position or the occupant-releasing position, said limit switch being integral with the guide means; and
   a cover tube for guiding the drive member between a drive means for the drive member and a proximal end of the rail, said guide means having a portion for holding one end of the cover tube, said one end being remote from said driving means, at a position adjacent the proximal end of the rail when the unit is assembled in the passive seat belt system;
   wherein a bulged portion having an outer diameter greater than the cover tube is formed integrally with the end of the cover tube and the bulged portion is in engagement with the holding portion of the guide means; and
   wherein the holding portion defines an embracive recess holding therein the cover tube at a portion lying from the bulged portion toward the opposite end of the cover tube, and the embracive recess includes a cylindrical space, which has a diameter slightly greater than the diameter of the cover tube but smaller than that of the bulged portion, and a guide space opening outwardly with a progressively increasing width from the cylindrical opening.

6. A passive seat belt system comprising:
   a rail;
   an anchor movable along the rail;
   a webbing connected to the movable anchor, said movable anchor being displaceable between an occupant-restraining position where the webbing restrains an occupant and an occupant-releasing position where the occupant is free from restraint by the webbing;
   a member for driving the movable anchor between the occupant-restraining position and the occupant-releasing position;
   a cover tube provided between a means for driving the drive member and a proximal end of the rail, whereby the drive member is guided by the cover tube; and
   a limit switch unit disposed within a casing near one end of the rail, sid limit switch unit comprising:
      limit switch means for detecting the arrival of the movable anchor at the occupant-restraining position or the occupant-releasing position;
      housing means for housing the limit switch means within the casing; and
      a holding portion defined by said limit switch unit for holding the cover tube on the proximal end of the rail, said holding portion being formed integrally and of one piece with said housing means.

7. The system of claim 6 further comprising a guide portion for guiding only the drive member into the rail, said guide portion being defined by said limit switch unit.

8. The system of claim 6, further comprising an anchor base adapted to be arranged on the side of the occupant-restraining position with the rail surrounded thereby, said limit switch unit being fixed on the anchor base.

9. The system of claim 8, wherein the limit switch unit has at least one positioning lug which extends in a direction perpendicular to the length of the rail when the unit is assembled in the passive seat belt system, the anchor base defines a matching notch, and the lug is in engagement with the notch to achieve positioning of the limit switch unit relative to the anchor base.

* * * * *